United States Patent
Sugano et al.

(10) Patent No.: US 7,210,289 B2
(45) Date of Patent: May 1, 2007

(54) OUTPUT CONTROL SYSTEM FOR ENGINE WITH EXHAUST CONTROL FUNCTION

(75) Inventors: Kiyoyuki Sugano, Saitama (JP); Norihiko Sasaki, Saitama (JP); Noritake Takami, Saitama (JP); Yuichi Moriyama, Saitama (JP); Hiroaki Tamai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 10/888,527

(22) Filed: Jul. 9, 2004

(65) Prior Publication Data

US 2005/0033502 A1 Feb. 10, 2005

(30) Foreign Application Priority Data

Aug. 6, 2003 (JP) ............... 2003-206265

(51) Int. Cl.
- *F01N 7/00* (2006.01)
- *F01N 3/00* (2006.01)
- *F02M 25/06* (2006.01)
- *F02D 9/06* (2006.01)

(52) U.S. Cl. .................. 60/324; 60/277; 60/278; 60/285; 123/323

(58) Field of Classification Search .......... 60/324; 123/323, 90.15, 90.16, 190.17; 181/236, 181/254

See application file for complete search history.

(56) References Cited

U.S. PATENT DOCUMENTS

| | | | | |
|---|---|---|---|---|
| 4,748,567 A | * | 5/1988 | Sumizawa et al. | 701/114 |
| 5,092,298 A | * | 3/1992 | Suzuki et al. | 123/361 |
| 5,327,856 A | * | 7/1994 | Schroeder et al. | 123/90.11 |
| 5,452,578 A | * | 9/1995 | Barber | 60/324 |
| 5,537,961 A | * | 7/1996 | Shigeru et al. | 123/90.15 |
| 5,629,852 A | * | 5/1997 | Yokoyama et al. | |
| 6,381,952 B1 | * | 5/2002 | Asanuma et al. | 60/284 |
| 6,477,830 B2 | * | 11/2002 | Takakura et al. | 60/277 |
| 6,584,767 B1 | * | 7/2003 | Koenig | 60/288 |

(Continued)

FOREIGN PATENT DOCUMENTS

DE 10144674 4/2003

(Continued)

*Primary Examiner*—Thomas Denion
*Assistant Examiner*—Loren Edwards
(74) *Attorney, Agent, or Firm*—Carrier, Blackman & Associates, P.C.; Joseph P. Carrier; William D. Blackman

(57) ABSTRACT

An engine output control system includes an engine ECU having a fundamental ignition timing map, a fundamental fuel injection quantity map, a target throttle angle determination unit for determining a target throttle angle of an exhaust control valve, an exhaust control valve diagnosis unit for diagnosing operation of the exhaust control valve, an ignition timing map to be used during an abnormality for determining fundamental ignition timing when the exhaust control valve operates abnormally, and an abnormal fuel injection thinning-out table for determining a reduced rate of fuel injection when the exhaust control valve has been diagnosed as abnormal. The exhaust control valve driving unit supplies a driving current to an actuator in such a manner that the target throttle angle notified by the engine ECU coincides with actual valve throttle angle. The system is capable of obtaining sufficient traveling performance even when an exhaust control valve has is operating abnormally.

18 Claims, 3 Drawing Sheets

U.S. PATENT DOCUMENTS

| | | |
|---|---|---|
| 6,687,601 B2 * | 2/2004 | Bale et al. |
| 6,711,492 B1 * | 3/2004 | Pursifull et al. ............ 701/114 |
| 6,775,609 B2 * | 8/2004 | Ozeki et al. ................ 701/114 |
| 6,968,677 B2 * | 11/2005 | Tamura ....................... 60/277 |
| 2003/0115854 A1 * | 6/2003 | Tamura et al. ................ 60/277 |
| 2003/0140624 A1 * | 7/2003 | Tatsukawa ................... 60/324 |

FOREIGN PATENT DOCUMENTS

| | | |
|---|---|---|
| EP | 1365137 | 11/2003 |
| JP | 7180556 | 7/1995 |
| JP | 2000240472 | 9/2000 |
| JP | 2000257452 | 9/2000 |
| JP | 2002138828 A | 5/2002 |
| JP | 2003-097345 | 4/2003 |
| JP | 2003328765 | 11/2003 |
| WO | WO02068807 | 9/2002 |

* cited by examiner

| INJECTION THINNING-OUT RATIO Rex (%) | 0<Ne1 | Ne1<Ne2 | Ne2<Ne3 | Ne3< |
|---|---|---|---|---|
| | 0 | 25 | 50 | 100 (FUEL CUT) |

OUTPUT CONTROL SYSTEM FOR ENGINE WITH EXHAUST CONTROL FUNCTION

CROSS-REFERENCE TO RELATED APPLICATIONS

The present invention claims priority under 35 USC 119 based on Japanese patent application No. 2003-206265, filed Aug. 6, 2003.

BACKGROUND OF THE INVENTION

1. Field of the Invention

The present invention relates to an output control system for an engine with an exhaust control device, and more particularly to an output control system for an engine equipped with an exhaust control function which controls an exhaust pulse by providing means such as a valve for changing an exhaust gas passage cross-sectional area midway in an engine exhaust air system.

2. Description of the Background Art

In Japanese Patent Laid-Open No. 1-313621 or 2002-138828, there has been disclosed a technique for improving engine output by reducing resistance within an exhaust passage in a high speed area of an engine and utilizing a pulsation effect, or arranging an exhaust control valve for making the exhaust gas cross-sectional area variable within the exhaust passage in order to improve the startability for dynamically changing its throttle angle in accordance with control parameters such as a vehicle speed and an engine speed.

Assuming that the above-described exhaust control valve is functioning normally, fundamental ignition timing and fundamental injection quantity of fuel in a vehicle mounted with the above-described exhaust control valve are determined with a throttle angle, engine speed, vehicle speed or the like as parameters. Thus, actual ignition timing and fuel injection quantity are determined by multiplying these fundamental ignition timing and fundamental injection quantity of fuel by various correction factors. Therefore, since when the exhaust control valve is functioning abnormally for some reason or other, the fundamental ignition timing or the fundamental injection quantity deviates from the optimum value, there is a possibility of causing problems such as deteriorated engine performance and lowered fuel economy.

It is an object of the present invention to solve the above-described problems of the conventional technique, and to provide an engine exhaust control device capable of obtaining sufficient traveling performance even when the exhaust control valve is functioning abnormally.

SUMMARY OF THE INVENTION

In order to achieve the above-described object, according to the present invention, there is provided an output control system for an engine in which midway in an exhaust passage for guiding exhaust gas from the engine, there has been arranged an exhaust control valve for making an exhaust gas passage cross-sectional area thereof variable. The output control system includes diagnosis means for diagnosing whether or not the exhaust control valve is operating normally and output limiting means for lowering the engine output when operation of the exhaust control valve is diagnosed as abnormal.

According to the above-described system, since when the exhaust control valve is functioning abnormally, control is performed so as to lower the engine output, even when the exhaust control valve is operating such that the exhaust gas cross-sectional area becomes smaller than a set point, sufficient engine performance can be secured and the engine efficiency can be improved.

DETAILED DESCRIPTION OF THE INVENTION

Figure 1:
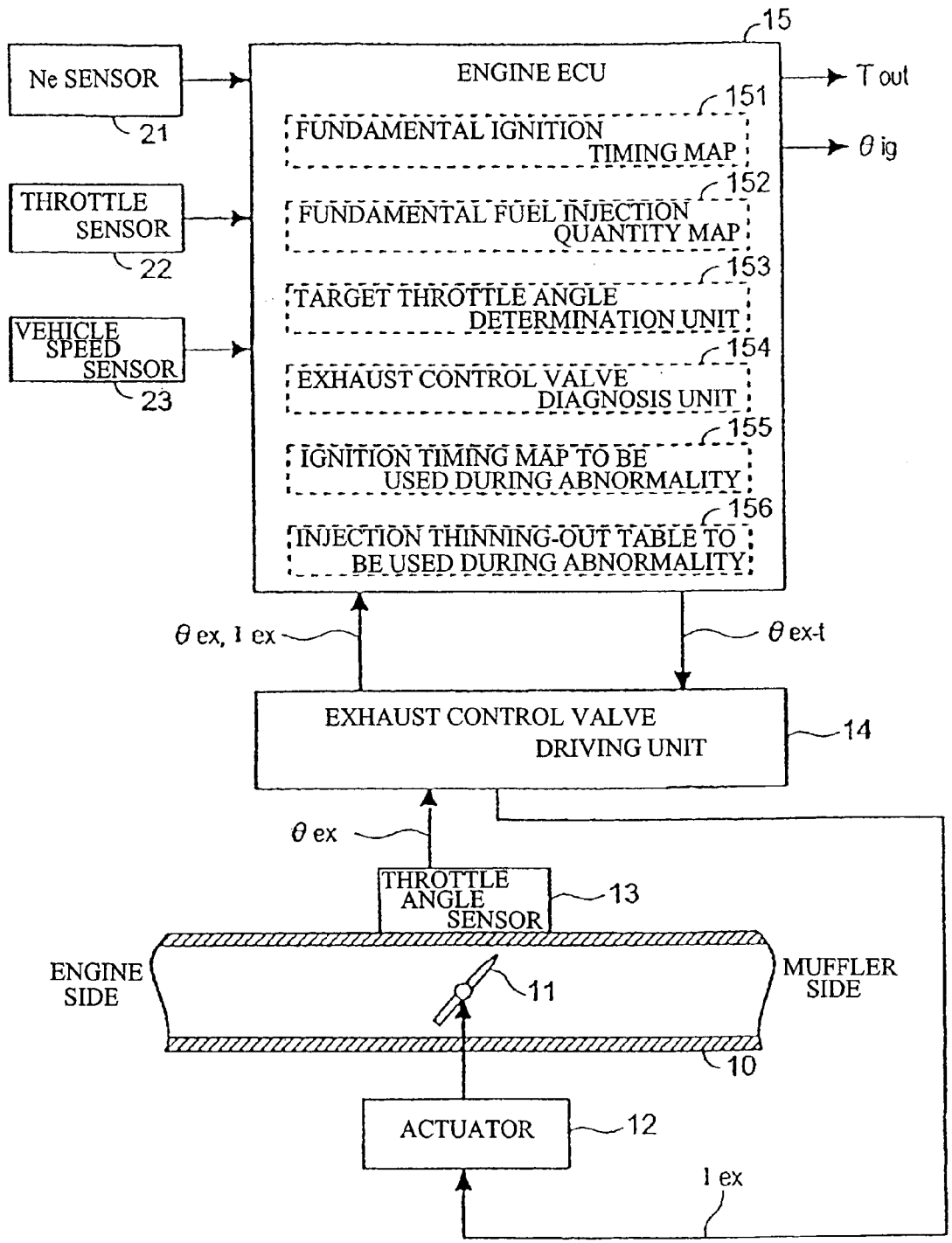
FIG. 1 is a block diagram showing structure of a principal part of an engine output control system according to an embodiment of the present invention.

Hereinafter, with reference to the drawings, the detailed description will be made of an embodiment of the present invention. FIG. 1 is a block diagram showing structure of a principal part of an engine output control system according to the embodiment of the present invention, and within an exhaust passage 10, between an engine and a muffler, there is mounted an exhaust control valve 11. The exhaust control valve 11 variably controls the exhaust gas passage cross-sectional area by being rotated by an actuator 12 to be driven by an exhaust control valve driving unit 14. A throttle angle θex of the exhaust control valve 11 is detected by a throttle angle sensor 13, and this information is sent to the exhaust control valve driving unit 14.

An engine ECU 15 includes: a fundamental ignition timing map 151 for determining fundamental ignition timing θig (θig1) on the basis of control parameters such as engine speed Ne detected by an engine speed sensor 21, a throttle angle θth obtained by detecting by a throttle angle sensor 22 and vehicle speed Vs obtained by detecting by a vehicle speed sensor 23; a fundamental fuel injection quantity map 152 for determining fundamental injection quantity Tout of fuel on the basis of the control parameters; and a target throttle angle determination unit 153 for determining a target throttle angle θex-t of the exhaust control valve 11 on the basis of the control parameters.

The engine ECU 15 further includes: an exhaust control valve diagnosis unit 154 for diagnosing a throttle angle abnormality or an operation abnormality of the exhaust control valve 11; an ignition timing map 155 to be used during an abnormality for determining fundamental ignition timing θig (θig2) when the exhaust control valve 11 has been diagnosed as functioning abnormally; and an injection thinning-out table 156 to be used during an abnormality for determining a thinning-out ratio Rex for fuel injection when the exhaust control valve 11 has been diagnosed as functioning abnormally.

The exhaust control valve driving unit 14 supplies driving current Iex to the actuator 12 in such a manner that under normal operating conditions, the target throttle angle θex-t indicated by the engine ECU 15 coincides with actual valve throttle angle θex to be detected by the throttle angle sensor 13. The exhaust control valve driving unit 14 further notifies the engine ECU 15 of the sensed valve throttle angle θex obtained by detecting with the throttle angle sensor 13.

The exhaust control valve driving unit 14 supplies driving current Iex to the actuator 12 in such a manner that the target throttle angle θex-t indicated by the engine ECU 15 coincides with actual valve throttle angle θex to be detected by the throttle angle sensor 13. The exhaust control valve driving unit 14 further notifies the engine ECU 15 of the valve throttle angle θex obtained by detecting with the throttle angle sensor 13.

Figure 2:
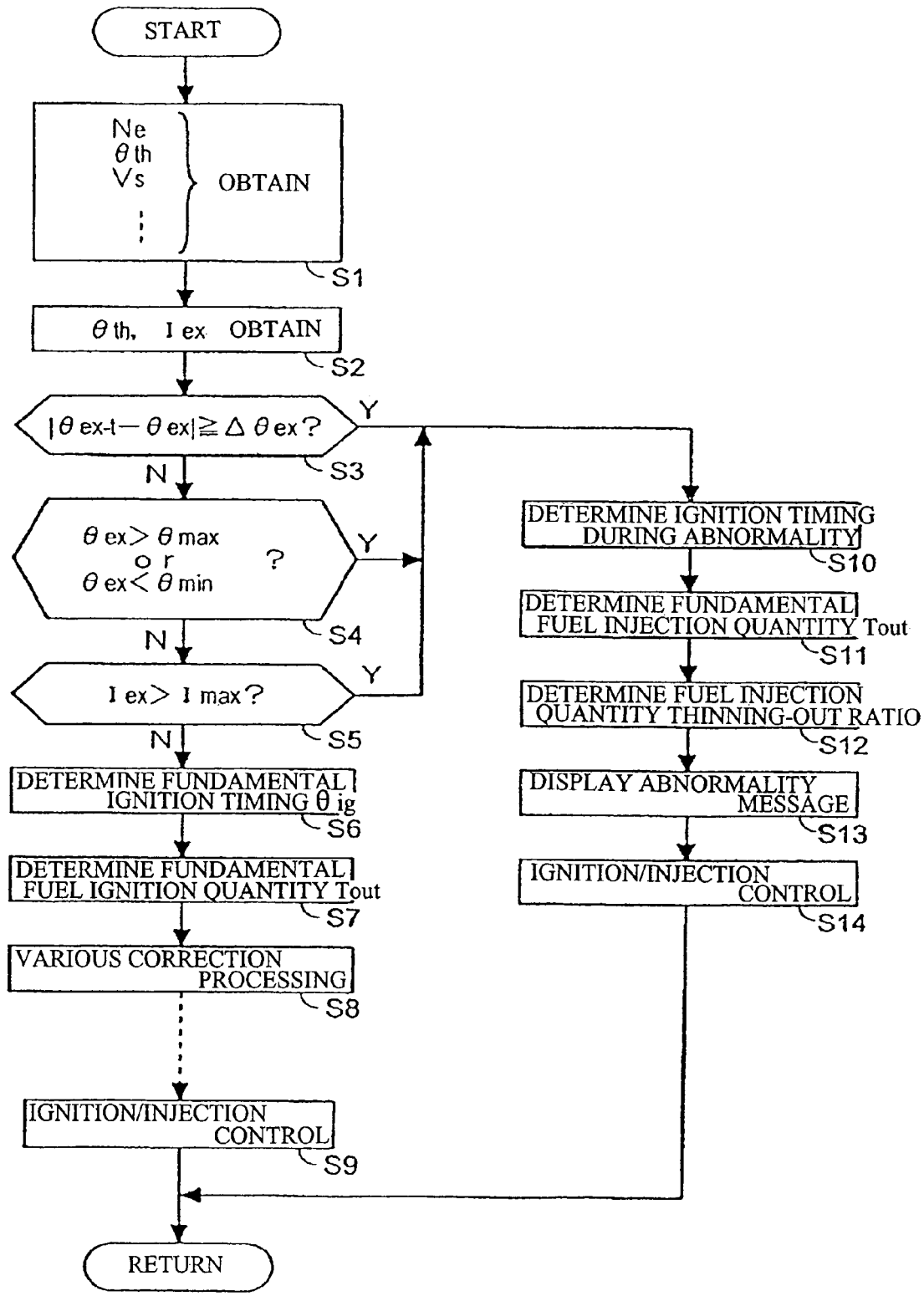
FIG. 2 is a flow chart showing an operation of engine output control according to an embodiment of the present invention.

Next, with reference to the flow chart of FIG. 2, the operation of the present embodiment will be described. In a step S1, control parameters, such as engine speed Ne, throttle angle θth and vehicle speed Vs which have been obtained by detecting with each of the related sensors, are taken in. In a step S2, exhaust control valve throttle angle θex and actuator driving current Iex, of which have been indicated by the exhaust control valve driving unit 14, are taken in.

In a step S3, a difference value between the target throttle angle θex-t, which has been determined by the target throttle angle determination unit 153, and of which the exhaust control valve driving unit 14 has been indicated, and an actual valve throttle angle θex, of which has been indicated by the exhaust control valve driving unit 14, is determined by the diagnosis unit 154, and this difference value is compared with a reference difference value Δθex. In this case, if an absolute value of the difference value is equal to or exceeds the reference difference value Δθex, it will be diagnosed as a throttle angle abnormality and the sequence will proceed to a step S10. If the absolute value of the difference value is less than the reference difference value Δθex, the sequence will proceed to a step S4.

In a step S4, the actual valve throttle angle θex is compared with an upper limit throttle angle θmax and a lower limit throttle angle θmin in the diagnosis unit 154. The upper limit throttle angle θmax and the lower limit throttle angle θmin have been set to the upper limit value and lower limit value of valve throttle angle θex respectively which can be taken when the exhaust control valve 11 is normally operating. Therefore, if the actual valve throttle angle θex exceeds the upper limit throttle angle θmax or falls short of the lower limit throttle angle θmin, it will be diagnosed as a throttle angle abnormality, and the sequence will proceed to the step S10. If the valve throttle angle θex is anywhere from the upper limit throttle angle θmax to the lower limit throttle angle θmin, the sequence will proceed to a step S5.

In a step S5, the actuator driving current Iex, of which has been notified by the exhaust control valve driving unit 14, is compared with the upper limit value Imax in the diagnosis unit 154. The upper limit value Imax has been set in advance to a value which is capable of detecting a lock current which flows when the actuator 12 is locked, or a value of a current which flows when an excessive load is applied to the actuator 12. If a driving current Iex exceeds the upper limit value Imax, it will be diagnosed as an operation abnormality and the sequence will proceed to the step S10. If the driving current Iex is equal to or falls short of the upper limit value Imax, the sequence will proceed to a step S6.

In a step S6, on the basis of the control parameters such as engine speed Ne, throttle angle θth and vehicle speed Vs, the fundamental ignition timing map 151 is referred to and the fundamental ignition timing θig is determined. In a step S7, on the basis of the control parameters, the fundamental fuel injection quantity map 152 is referred to and the fundamental fuel injection quantity Tout is determined. In a step S8, various correction factors such as an acceleration correction factor and a cooling water correction factor are multiplied by the fundamental fuel injection quantity Tout.

In a step S9, on the basis of the fundamental ignition timing θig and the fundamental fuel injection quantity Tout, the engine is controlled.

On the other hand, when diagnosed as abnormal in any of the steps S3, S4 and S5, in a step S10, on the basis of the control parameters, the ignition timing map to be used during an abnormality 155 is referred to, and the ignition timing during the abnormality is determined.

Figures 3, 4:
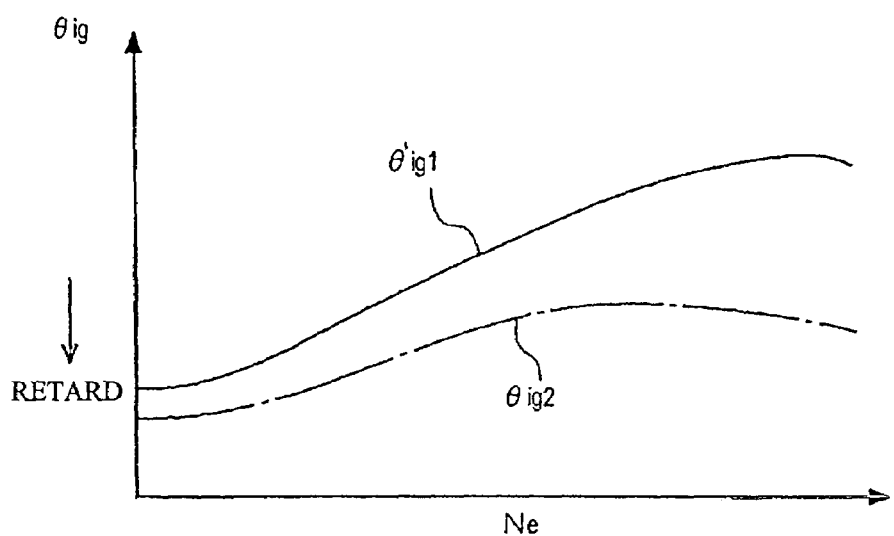
FIG. 3 is a view showing relationship between fundamental ignition timing and ignition timing when the exhaust control valve is functioning abnormally.
FIG. 4 is a view showing one example of an injection thinning-out ratio table.

FIG. 3 is a graphical view showing relationship between ignition timing θig1 to be determined on the basis of the fundamental ignition timing map 151 and ignition timing θig2 to be determined on the basis of the modified ignition timing map 155 to be used during an abnormality, and illustrated with the control parameters limited to the engine speed Ne. In the present embodiment, when the exhaust control valve 11 is diagnosed as functioning abnormally, the ignition timing θig is to be retarded over the entire area of the engine speed Ne in such a manner that the engine output becomes lower than at all times of normal operation.

FIG. 3 is a view showing relationship between ignition timing θig1 to be determined on the basis of the fundamental ignition timing map 151 and ignition timing θig2 to be determined on the basis of the ignition timing map 155 to be used during an abnormality, and illustrated with the control parameters limited to the engine speed Ne. In the present embodiment, when the exhaust control valve 11 is diagnosed as functioning abnormally, the ignition timing θig is to be retarded over the entire area of the engine speed Ne in such a manner that the engine output becomes lower than at all times of normal operation.

In a step S11, as in the case of the step S7, on the basis of the control parameters, the fundamental fuel injection quantity map 152 is referred to and the fundamental fuel injection quantity Tout is determined. In a step S12, on the basis of the control parameters, an injection thinning-out table 156 to be used during abnormality is referred to and an injection thinning-out ratio Rex (%), corresponding to the percentage amount by which the normal rate of fuel injections is reduced, is determined in accordance with the control parameter value.

FIG. 4 is a view showing one example of the injection thinning-out table 156 to be used during an abnormality, and illustrated with the control parameters limited to the engine speed Ne. In the present embodiment, when the exhaust control valve 11 is diagnosed as functioning abnormally, the thinning-out ratios Rex responsive to the engine speed Ne have been set stepwise in such a manner that the engine output becomes lower than at all times of normal operation.

In a step S13, a message to the effect that the exhaust control valve 11 is functioning abnormally is displayed on an instrument panel or the like (not shown). In a step S14, the engine is controlled on the basis of the ignition timing θig2, the fundamental fuel injection quantity Tout and the thinning-out ratios Rex which have been determined in such a manner that the engine output becomes lower than at all times of normal operation.

According to the present invention, since when the exhaust control valve is functioning abnormally, at least one of the ignition timing and the fuel injection quantity is controlled in such a manner that the engine exhaust becomes lower, even when the exhaust control valve operates in such a manner that the exhaust gas cross-sectional area reduces as compared with the set point, sufficient engine performance can be secured and engine efficiency can be improved.

Although the present invention has been described herein with respect to an illustrative embodiment, the foregoing description is intended to be illustrative, and not restrictive.

Those skilled in the art will realize that many modifications of the embodiment could be made which would be operable. All such modifications which are within the scope of the claims are intended to be within the scope and spirit of the present invention.

Having thus described the invention, what is claimed is:

1. An output control system for an engine of the type operating with timed spark ignition, in which, in an exhaust passage for guiding exhaust gas from the engine, at a location external to and downstream from the engine, there has been arranged an exhaust control valve for making an exhaust gas cross-sectional area thereof variable, the output control system comprising:
   diagnosis means for diagnosing whether or not said exhaust control valve is operating normally; and
   output limiting means for lowering the engine output when an operation of said exhaust control valve is diagnosed as abnormal,
   said output limiting means reduces a rate of fuel injections to the engine according to thinning out ratios responsive to the engine speed have-been, said thinning out ratios being set stepwise such that the engine output becomes lower than at all times of normal operation.

2. The output control system according to claim 1, wherein said output limiting means also retards ignition timing as compared with a fundamental ignition timing for the engine.

3. The output control system according to claim 1, further comprising a display which indicates when an operation of said exhaust control valve is diagnosed as abnormal.

4. The engine exhaust control device according to claim 2, further comprising a display which indicates when an operation of said exhaust control valve is diagnosed as abnormal.

5. An output control system for an engine of the type operating with timed spark ignition, said system comprising
   an exhaust control valve, wherein the exhaust control valve is positioned within an exhaust passage for guiding exhaust gas from the engine such that it lies between the engine and a muffler,
   the exhaust control valve providing variability in a cross sectional area of the exhaust passage, and including a throttle variably angularly positioned within the exhaust passage, in a normal operating range between a maximum throttle angle and a minimum throttle angle,
   an actuator for actuating the throttle within the exhaust control valve,
   diagnosis means for diagnosing whether or not said exhaust control valve is operating normally; and
   output limiting means for lowering the engine output when an operation of said exhaust control valve is diagnosed as operating abnormally.

6. The output control system of claim 5 wherein the diagnosis means determines a difference between a target throttle angle and an actual throttle angle, wherein when the difference is greater than a predetermined level, then the diagnosis means determines that the exhaust control valve is operating abnormally.

7. The output control system of claim 5 wherein the diagnosis means determines a difference between a target throttle angle and an actual throttle angle, wherein when an absolute value of the difference is greater than a predetermined level, then the diagnosis means determines that the exhaust control valve is operating abnormally.

8. The output control system of claim 5 wherein the diagnosis means compares an actuator driving current and a predetermined allowable current, wherein
   when the actuator driving current exceeds the predetermined allowable current, then the diagnosis means determines that the exhaust control valve is operating abnormally.

9. The output control system of claim 5 wherein said output limiting means controls at least one of ignition timing and fuel injection quantity so as to lower the engine output.

10. The output control system according to claim 5, wherein said output limiting means retards ignition timing as compared with the fundamental ignition timing when it is determined that the exhaust control valve is operating abnormally.

11. The output control system according to claim 5, wherein said output limiting means reduces a rate of fuel injections to the engine.

12. The output control system of claim 6, wherein said output limiting means controls at least one of ignition timing and fuel injection quantity so as to lower the engine output.

13. The output control system according to claim 6, wherein said output limiting means retards ignition timing as compared with the fundamental ignition timing when it is determined that the exhaust control valve is operating abnormally.

14. The output control system according to claim 6, wherein said output limiting means reduces a rate of fuel injections to the engine.

15. The output control system of claim 8 wherein said output limiting means controls at least one of ignition timing and fuel injection quantity so as to lower the engine output.

16. The output control system according to claim 8, wherein said output limiting means retards ignition timing as compared with the fundamental ignition timing when it is determined that the exhaust control valve is operating abnormally.

17. The output control system according to claim 8, wherein said output limiting means reduces a rate of fuel injections to the engine.

18. A method of monitoring and controlling engine output in an internal combustion engine operating with timed spark ignition, said method comprising the steps of monitoring a condition of an exhaust control valve in an exhaust system connected to said engine by reviewing input from at least one control valve sensor connected to said exhaust control valve, where said control valve sensor comprises an exhaust throttle angle sensor or a current sensor which reads a current applied to an exhaust control valve actuator; comparing said input with a range of acceptable reference values to determine whether said exhaust control valve is functioning normally; and lowering output of the engine when said input is outside the range of acceptable reference values, by reducing a rate of fuel injections to the engine according to thinning out ratios responsive to the engine speed, said thinning out ratios being set stepwise such that the engine output becomes lower than at all times of normal operation.

* * * * *